United States Patent
Kanzawa et al.

(10) Patent No.: US 10,409,288 B2
(45) Date of Patent: Sep. 10, 2019

(54) SYSTEMS AND METHODS FOR PROJECTING A LOCATION OF A NEARBY OBJECT INTO A MAP ACCORDING TO A CAMERA IMAGE

(71) Applicant: Toyota Research Institute, Inc., Los Altos, CA (US)

(72) Inventors: Yusuke Kanzawa, Ann Arbor, MI (US); Kuan-Hui Lee, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 15/585,878

(22) Filed: May 3, 2017

(65) Prior Publication Data

US 2018/0321686 A1 Nov. 8, 2018

(51) Int. Cl.
*G05D 1/02* (2006.01)
*G06K 9/00* (2006.01)
*G08G 1/16* (2006.01)

(52) U.S. Cl.
CPC ........... *G05D 1/0246* (2013.01); *G05D 1/027* (2013.01); *G05D 1/0272* (2013.01); *G05D 1/0274* (2013.01); *G05D 1/0278* (2013.01); *G06K 9/00805* (2013.01); *G08G 1/166* (2013.01)

(58) Field of Classification Search
CPC .... G05D 1/0246; G05D 1/027; G05D 1/0272; G05D 1/0274; G05D 1/0278; G06K 9/00791; G06K 9/00805; G08G 1/166
See application file for complete search history.

(56) References Cited

U.S. PATENT DOCUMENTS

| | | |
|---|---|---|
| 5,390,125 A | 2/1995 | Sennott et al. |
| 6,816,184 B1 | 11/2004 | Brill et al. |
| 8,547,448 B2 | 10/2013 | Shikatani et al. |
| 9,940,527 B2 * | 4/2018 | Lee ................... G06K 9/00798 |
| 2010/0098297 A1 | 4/2010 | Zhang |
| 2010/0104137 A1 | 4/2010 | Zhang et al. |
| 2010/0104199 A1 | 4/2010 | Zhang et al. |
| 2016/0137206 A1 * | 5/2016 | Chandraker ............ G06T 17/00 382/104 |
| 2016/0210525 A1 * | 7/2016 | Yang ................... G06K 9/0063 |

FOREIGN PATENT DOCUMENTS

| | | |
|---|---|---|
| JP | 2007010515 | 1/2007 |
| JP | 2007114007 | 5/2007 |

* cited by examiner

*Primary Examiner* — Nga X Nguyen
(74) *Attorney, Agent, or Firm* — Christopher G. Darrow; Darrow Mustafa PC

(57) ABSTRACT

System, methods, and other embodiments described herein relate to locating an object within an image and projecting the object into a map. In one embodiment, a method includes, responsive to identifying a nearby vehicle in an image of an external environment surrounding a scanning vehicle, determining a relative location of the nearby vehicle in relation to the scanning vehicle using the image. The method includes projecting the nearby vehicle into a map according to at least the relative location determined from the image. The method includes controlling the scanning vehicle according to the map.

17 Claims, 5 Drawing Sheets

FIG. 5
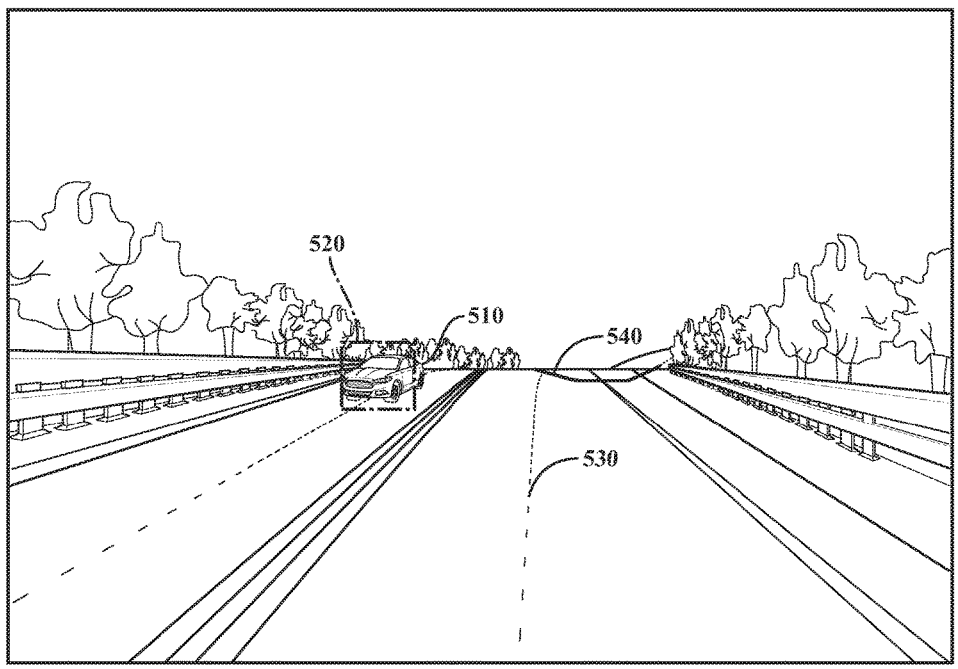
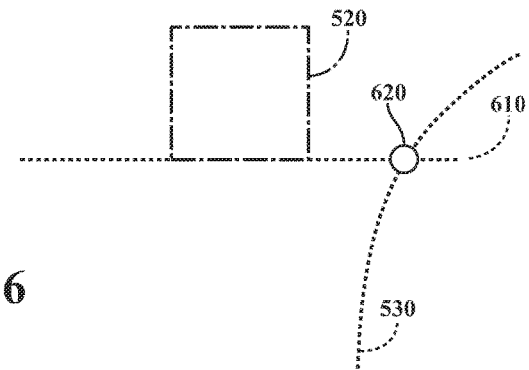
FIG. 6

SYSTEMS AND METHODS FOR PROJECTING A LOCATION OF A NEARBY OBJECT INTO A MAP ACCORDING TO A CAMERA IMAGE

TECHNICAL FIELD

The subject matter described herein relates in general to systems for localizing nearby objects using camera images and, more particularly, to using camera images to locate nearby objects and project the nearby objects into a map.

BACKGROUND

Locating objects in an environment using electronic means such as light detection and ranging (LIDAR) sensors can be a complex task. For example, a LIDAR sensor may not obtain data about an object that is beyond a range of the LIDAR sensor. Thus, recognizing an oncoming vehicle may not occur when using a LIDAR sensor until the vehicle is within the range of the LIDAR sensor to a scanning vehicle. Consequently, a computing system of the scanning vehicle may not have a complete perception of a surrounding environment.

Moreover, when the scanning vehicle is operating in an autonomous mode, the vehicle uses the LIDAR sensor to build an obstacle map of objects in the surrounding environment. In general, the vehicle uses the obstacle map to avoid objects within the surrounding environment. However, because the LIDAR sensor provides for detecting objects within the indicated range, this obstacle map may not provide an extensive perception of the surrounding environment. Thus, the vehicle may not be able to plan maneuvers as far in advance as desired because of the indicated range. As a result, the vehicle may not be able to adequately navigate the surrounding environment because of this lack of information.

SUMMARY

An example of an object projection system that uses camera images to localize and project objects into a map is presented herein. In one embodiment, the object projection system acquires an image from a camera of a scanning vehicle. Thereafter, the object projection system identifies a nearby vehicle in the image and determines a relative position of the nearby vehicle from the scanning vehicle by analyzing the acquired image. Accordingly, the object projection system can subsequently project a representation of the nearby vehicle into the map using, for example, the relative location along with a location of the scanning vehicle. In this way, the object projection system provides for using an image that includes an object (e.g., the nearby vehicle) to locate the object and update the map with the determined location.

In one embodiment, an object projection system of a scanning vehicle is disclosed. The object projection system includes one or more processors and a memory that is communicably coupled to the one or more processors. The memory stores a projection module that includes instructions that when executed by the one or more processors cause the one or more processors to, responsive to identifying a nearby vehicle in an image of an external environment surrounding the scanning vehicle, determine a relative location of the nearby vehicle in relation to the scanning vehicle using the image. The projection module includes instructions to project the nearby vehicle into a map according to at least the relative location determined from the image. The memory stores a control module including instructions that when executed by the one or more processors cause the one or more processors to control the scanning vehicle according to the map.

In one embodiment, a non-transitory computer-readable medium is disclosed. The computer-readable medium stores instructions that when executed by one or more processors cause the one or more processors to perform the disclosed functions. The instructions include instructions to, responsive to identifying a nearby vehicle in an image of an external environment surrounding a scanning vehicle, determine a relative location of the nearby vehicle in relation to the scanning vehicle as a function of the image. The instructions include instructions to project the nearby vehicle into a map according to at least the relative location determined from the image. The instructions include instructions to control the scanning vehicle according to the map.

In one embodiment, a method of localizing objects around a scanning vehicle using an image is disclosed. The method includes, responsive to identifying a nearby vehicle in the image of an external environment surrounding the scanning vehicle, determining a relative location of the nearby vehicle in relation to the scanning vehicle using the image. The method includes projecting the nearby vehicle into a map according to at least the relative location determined from the image. The method includes controlling the scanning vehicle according to the map.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 5 illustrates an example image of an object that may be used according to systems and methods disclosed herein.

FIG. 6 illustrates an example diagram of a bounding box and a current centerline as generated by systems and methods disclosed herein when localizing an object in an image.

DETAILED DESCRIPTION

Systems, methods and other embodiments associated with using images from a camera to locate objects in a surrounding environment and project the objects into a map are disclosed. As mentioned in the background, some sensors may operate at a range that is directed to an area immediately surrounding a vehicle. In other words, these sensors may have a short or medium range that extends from the vehicle to a defined distance. Beyond the defined distance, the noted sensors may not, for example, provide reliable data for detecting various objects.

Therefore, in one embodiment, an object projection system uses images acquired from a camera to locate nearby objects and project the objects into a map. That is, in one embodiment, a scanning vehicle is equipped with one or more cameras that provide visible light images of the surrounding environment of the scanning vehicle. The cameras may be forward-facing, rear-facing, side-facing and/or in another orientation. In either case, the object projection system obtains images from the cameras in which various objects (e.g., vehicles, pedestrians, etc.) are visible. In one embodiment, the images can be of the objects at various distances (e.g., within and/or beyond the range of the LIDAR sensor) from the scanning vehicle.

Once the object projection system acquires an image, the system determines whether an object is present in the image and, if so, outlines the object using a bounding box. Subsequently, in one embodiment, the system projects a current centerline of the scanning vehicle into the image in a direction of the object. The object projection system can then determine a closest point of the current centerline to the bounding box from which a relative location of the object to the scanning vehicle is generated. The object projection system, in one embodiment, uses the relative location to determine an actual location of the object and to project the object into the map. The map is, for example, an obstacle map that includes various obstacles in the surrounding environment of the scanning vehicle. Thus, the scanning vehicle, in one embodiment, uses the map populated, at least in part, by the object projection system to plan a route and/or to navigate through the environment surrounding the vehicle. In this way, the object projection system provides for locating objects using images when additional sensors are not available, when objects are beyond a range of other sensors, or, in general, to simply identify locations for various objects.

Figure 1:
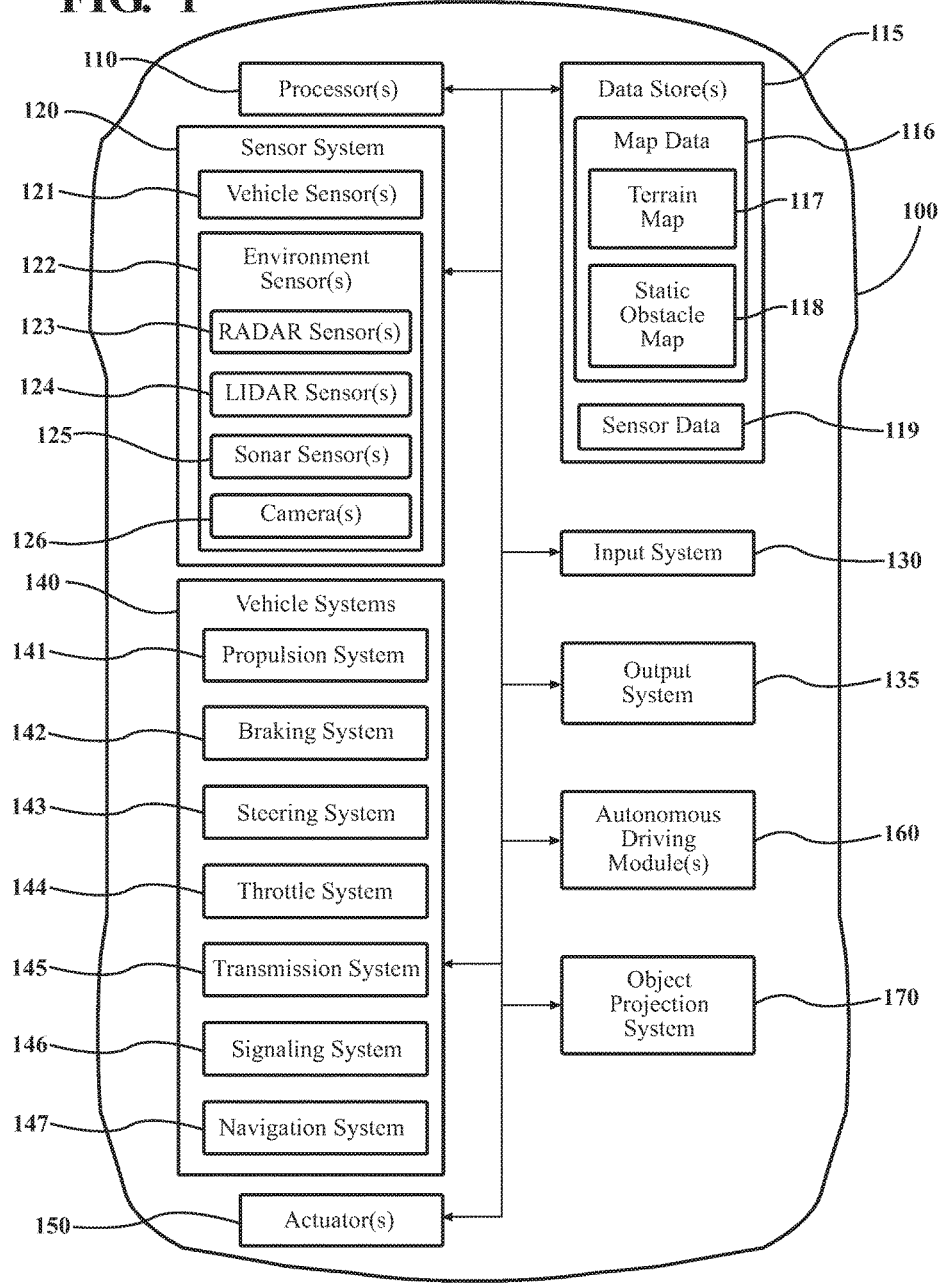
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport that benefits from locating objects in a surrounding environment using images acquired from one or more cameras.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. Further, while the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes an object projection system 170 that is implemented to perform methods and other functions as disclosed herein relating to projecting objects into a map as a function of images acquired of the objects. The noted functions and methods will become more apparent with a further discussion of the figures.

Figure 2:
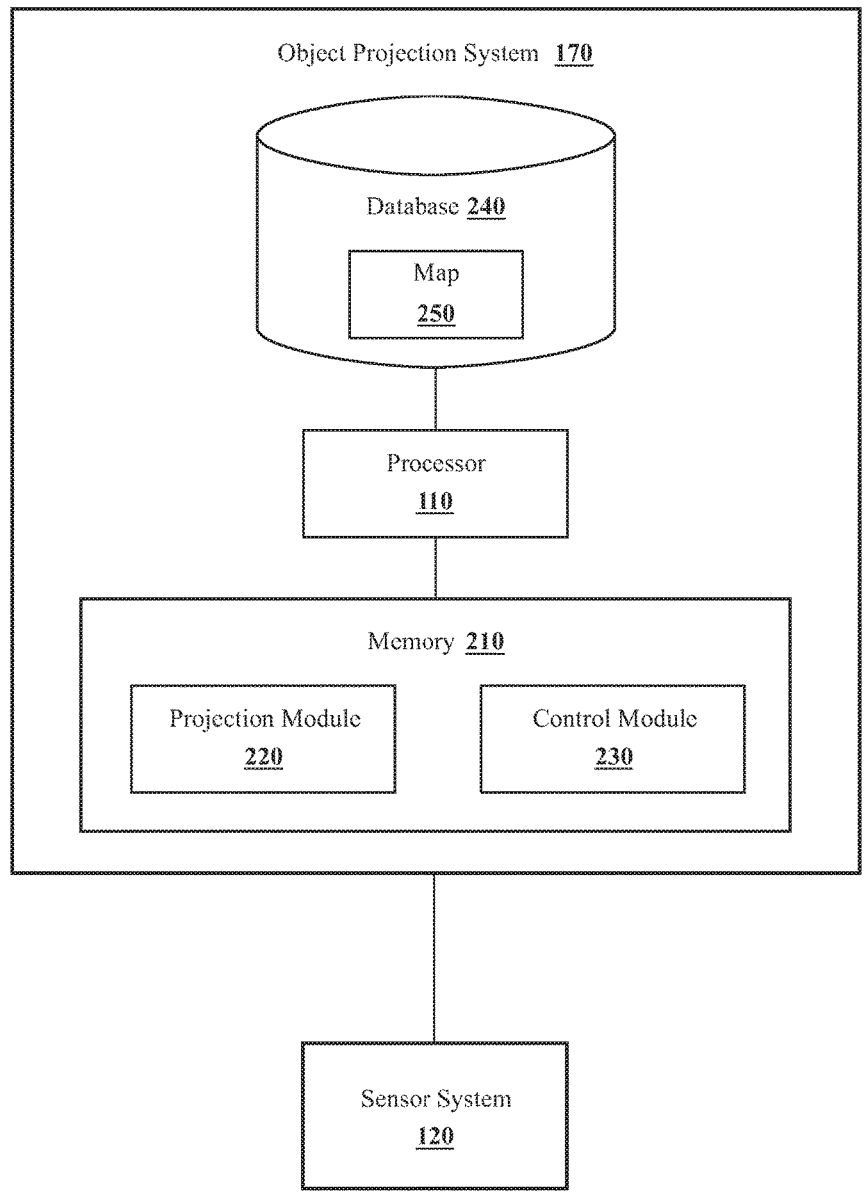
FIG. 2 illustrates one embodiment of an object projection system that is associated with projecting an object into a map as a function of an image of the object.

With reference to FIG. 2, one embodiment of the object projection system 170 of FIG. 1 is further illustrated. The object projection system 170 is shown as including the processor 110 from the vehicle 100 of FIG. 1. Accordingly, the processor 110 may be a part of the object projection system 170, the object projection system 170 may include a separate processor from the processor 110 of the vehicle 100, or the object projection system 170 may access the processor 110 through a data bus or another communication path. In one embodiment, the object projection system 170 includes a memory 210 that stores a projection module 220 and a control module 230. The memory 210 is a random-access memory (RAM), read-only memory (ROM), a hard-disk drive, a flash memory, a distributed memory, a cloud-based memory, or other suitable memory for storing the modules 220 and 230. The modules 220 and 230 are, for example, computer-readable instructions that when executed by the processor 110 cause the processor 110 to perform the various functions disclosed herein.

Accordingly, the projection module 220 generally includes instructions that function to control the processor 110 to acquire images from the sensor system 120 and analyze the images to locate objects and project the objects into a map 250. In other words, the projection module 220 includes instructions to localize objects depicted in the images in relation to the vehicle 100 so that the objects can be projected into the map 250. In one embodiment, the projection module 220 iteratively executes the process of projecting the object into the map 250 as the vehicle 100 progresses along a roadway and as additional images are acquired from a camera (e.g., camera 126). Thus, the projection module 220, in one embodiment, generates a projection of objects in the map 250 according to a refresh rate of the camera 126. Accordingly, the projection module 220 updates a location of an object that is present within a field-of-view of the camera 126 at a rate of, for example, 30 Hz, which corresponds to a number of frames per second (FPS) generated by the camera 126. In this way, the projection module 220 provides an updated location of objects so that the vehicle 100 can be aware of obstacles in the surrounding environment.

In one embodiment, the control module 230 includes instructions that function to control the processor 110 to compute input controls for autonomously controlling the vehicle 100 over the roadway according to the map 250. For example, the control module 230 includes instructions to analyze the map 250 for the objects projected into the map 250 by the projection module 220. The control module 230 can, for example, plan a route and/or various maneuvers (e.g., speed and steering angles) for the vehicle 100 to autonomously navigate around objects in the map 250. Alternatively, in one embodiment, the control module 220 controls various vehicle systems 140 to navigate, brake, accelerate, steer, display electronic warnings, generate audible warnings, and/or perform other tasks according to objects that are projected into the map 250.

With continued reference to the object projection system 170, in one embodiment, the system 170 includes a database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various determinations. In one embodiment, the database 240 includes the map 250, object identifying information (e.g., models), captured images, and so on.

The map 250 is, for example, an obstacle map such as map 118, a terrain map such as map 117, a planned route, a cartographic map, a three-dimensional environment map, a vector map, a topological map, a metric map, a rasterized satellite map, or another map that provides for defining positions of objects in relation to the vehicle 100. Accordingly, the projection module 220 maintains locations of objects within the map 250 as those objects relate to the vehicle 100 and as a function of acquired images. Thus, the projection module 220 dynamically updates the map 250 to maintain the locations while the vehicle progresses along a roadway. The control module 230 can monitor the objects using the map 250 and make determinations to, for example, maneuver the vehicle, notify a passenger/driver, communicate information to a service about the vehicle 100 and the objects within the map 250 (e.g., traffic), and so on.

Figure 3:
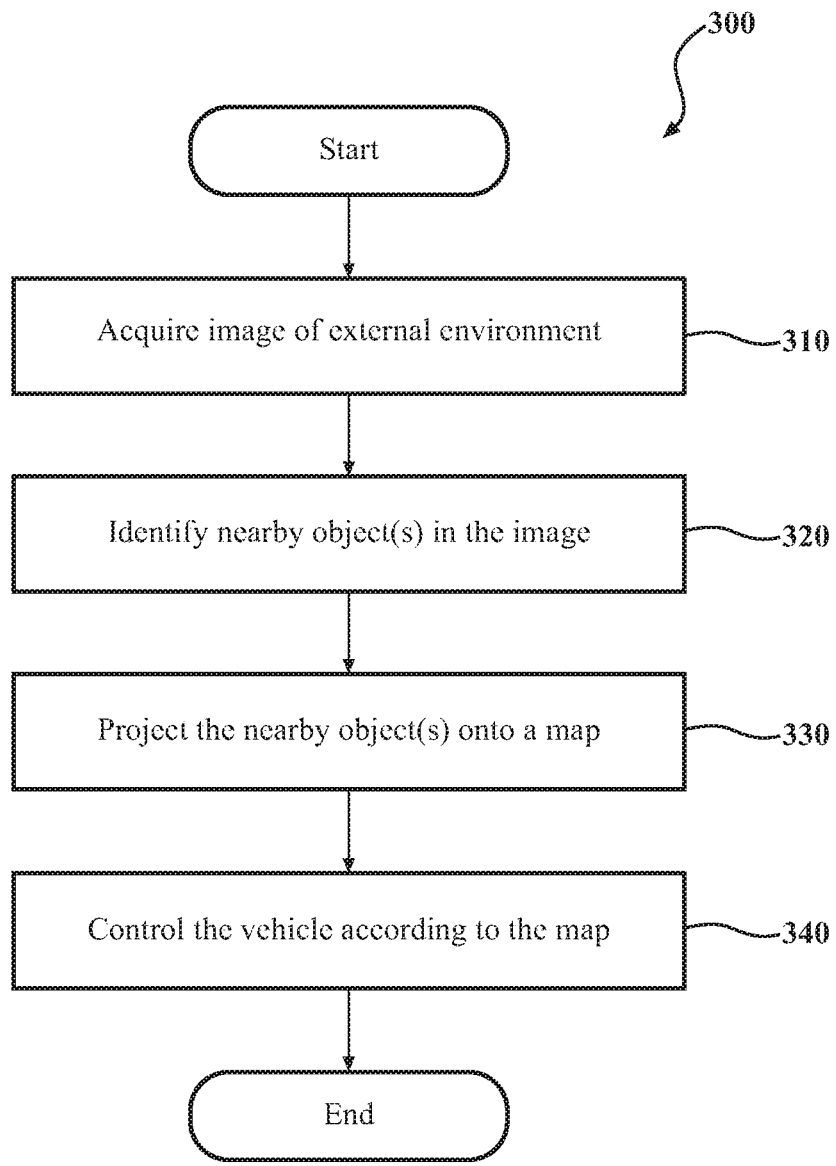
FIG. 3 illustrates one embodiment of a method that is associated with acquiring an image of an object and using the image to locate the object.

Additional aspects of locating objects and projecting the objects into the map 250 will be discussed in relation to FIG. 3. FIG. 3 illustrates a method 300 associated with projecting a nearby object onto a map. Method 300 will be discussed from the perspective of the object projection system 170 of FIGS. 1 and 2. While method 300 is discussed in combination with the object projection system 170, it should be appreciated that the method 300 is not limited to being implemented within the object projection system 170, but is instead one example of a system that may implement the method 300.

At 310, the projection module 220 acquires an image of an external environment of the vehicle 100. In one embodiment, the image is a forward-facing image that includes a field-of-view that extends forward of the vehicle 100. Accordingly, the image includes a depiction of objects that are in front of or generally forward of the vehicle 100. Furthermore, in one embodiment, the image may alternatively be from a rear-facing camera, a side-facing camera, or another orientation that generally provides a view of at least a portion of the external environment of the vehicle 100. The camera itself may be the camera(s) 126 and may be a visible light camera, an infrared camera, an ultra-violet light camera, a still image camera, a video camera, or, more generally, any suitable camera for providing images of objects that are proximate to the vehicle 100.

Accordingly, the image itself is, in one embodiment, a camera image with a resolution and captured spectrum of light that is appropriate for analyzing objects in an environment around the vehicle 100. Moreover, the image is, for example, communicated via a data bus or other communication channel from the one or more cameras 126 to the object projection system 170. In one embodiment, receiving the image causes the object projection system 170 to initiate the analysis at 310.

At 320, the projection module 220 identifies nearby objects in the image. That is, the projection module 220, upon receiving an image from one or more cameras, analyzes the image to identify whether an object is present. In one embodiment, the projection module 220 analyzes the image to determine whether any dynamic/moving objects are present in the image. Additionally, the projection module 220 may identify the dynamic/moving objects according to templates stored in the database 250, by subtracting the image from an immediately previous image to remove the background, or by another suitable approach. In general, the dynamic objects include objects within or adjacent to the roadway that are moving, can move but are stationary, and so on.

In either case, the projection module 220 identifies a presence of one or more objects, and, more particularly, dynamic objects by outlining those objects using bounding boxes. The bounding boxes are rectangles that are drawn about a perimeter of each of the noted objects within a coordinate system defined within the image. In this way, projection module 220 can isolate the objects from background noise and other aspects of the image.

At 330, the projection module 220 projects the objects identified at 320 into the map 250. As previously indicated, the map 250 is a topological map, a metric map, or another type of map that generally provides for relating objects in a spatial context. In either case, the projection module 220 determines a position of the objects relative to the vehicle 100 and uses this determination of position to project the objects into the map 250. Additional aspects of projecting the objects into the map 250 will be discussed subsequently in relation to method 400 of FIG. 4. However, it should be appreciated that as a general manner, at 330, the projection module 220 uses the image from the camera to localize the one or more objects and then projects the one or more objects into the map 250 as a function thereof. In this way, the projection module 220 leverages the image without the need for additional sensors to locate objects and maintain the map 250 therefrom.

At 340, the control module 230 controls the vehicle 100 according to the map 250. In one embodiment, the control module 230 controls the vehicle 100 by autonomously maneuvering the vehicle 100 using the map 250 as, for example, an obstacle map that locates various objects in the external environment of the vehicle 100. That is, the control module 230 uses the map 250 to determine a path along which to navigate the vehicle 100 that is free of obstacles. Moreover, the control module 230 may also use the map 250 to assess various threats to the vehicle 100. For example, the control module 230 can use the map 250 to assess whether a trajectory of an oncoming vehicle is moving into a lane of travel of the vehicle 100, whether another vehicle/object is moving within a threshold distance of a planned path of the vehicle 100, and/or to assess additional circumstances (e.g., traffic) that may affect the vehicle 100.

Moreover, while the control module 230 is generally discussed in relation to controlling the vehicle 100, in one embodiment, the control module 230 provides alerts and/or other indications to the autonomous module 160, to a driver/passenger, to nearby vehicles, to a remote service, and so on. In this way, the control module 230 can alert the driver/passenger to circumstances that require attention, alert the autonomous module 160 to perform various maneuvers, and so on. In general, it should be understood that the map 250 that is updated with objects by the projection module 220 can be used in a number of different ways and the listed uses are not intended to be limiting.

Figure 4:
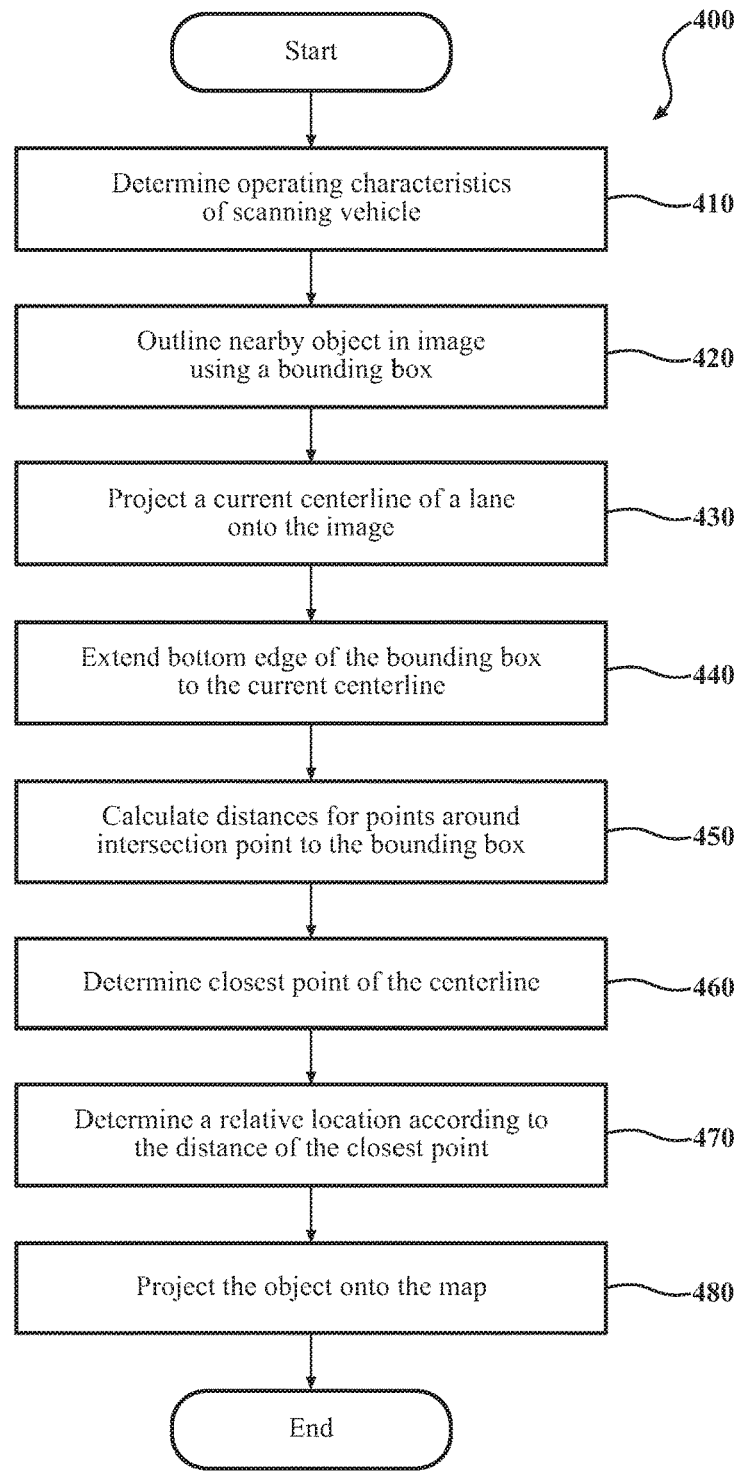
FIG. 4 illustrates one embodiment of a method that is associated with determining a relative location of an object in relation to a scanning vehicle as a function of an image.

Additional aspects of determining a relative location of an object and projecting the object into a map will be discussed in relation to FIG. 4. FIG. 4 illustrates a method 400 associated with locating a nearby object using an image. Method 400 will be discussed from the perspective of the object projection system 170 of FIGS. 1 and 2. While method 400 is discussed in combination with the object projection system 170, it should be appreciated that the method 400 is not limited to being implemented within the object projection system 170, but is instead one example of a system that may implement the method 400. As an initial matter, it should be noted that the method 400 generally embodies blocks 320 and 330 from FIG. 3. That is, the functions noted in blocks 320 and 330 are further described using blocks 410-480 of method 400. Accordingly, the block 410 generally occurs in response to the projection module 220 acquiring an image as noted previously at 310.

At 410, the projection module 220 determines operating characteristics of the vehicle 100. In one embodiment, the projection module 220 retrieves electronic data from one or more sensors of the scanning vehicle 100 to determine the operating characteristics. For example, the operating characteristics include a global position system (GPS) location (e.g., longitude and latitude), a yaw of the vehicle 100 from an inertial monitoring unit (IMU) sensor and/or from an inertial navigation system (INS), a speed of the vehicle 100 from a tachometer, and/or other information that is useful when localizing an object according to the image.

At 420, the projection module 220 outlines a nearby vehicle/object depicted within the image using a bounding box. It should be appreciated that while a nearby vehicle is discussed as the focus of this example, in one embodiment, the projection module 220 can simultaneously identify, localize, and project a plurality of different objects into the map 250 including vehicles, pedestrians, bicycles, and other objects.

In either case, the projection module 220 isolates each separate object of interest in the image using a separate bounding box. Moreover, the bounding box is, in one embodiment, a minimum bounding box that encloses a perimeter of the nearby vehicle/object. In one embodiment, extents of the bounding box are determined according to a furthest point of the nearby vehicle in each direction (e.g., x and y or x, y, and z depending on an orientation). In this way, the nearby vehicle can be distinguished from other portions of the image and general dimensions of the nearby object/vehicle can be identified.

At 430, the projection module 220 projects a current centerline into the image. The current centerline is of a lane within a roadway on which the scanning vehicle 100 is traveling. In one embodiment, the projection module 220 projects the current centerline by analyzing the roadway according to characteristics of the roadway in relation to, for example, calibration parameters of a camera (e.g., camera 126) that generated the image. Additionally, the projection module 220, in one embodiment, identifies characteristics of the roadway from the image itself and/or from the map 250. Accordingly, the projection module 220 can use GPS coordinates of the roadway, lane markers, topography and other characteristics of the roadway in order to project the current centerline.

Moreover, in one embodiment, the projection module 220 filters additional centerlines from the image that are produced as an artifact of projecting the current centerline. For example, as the projection module 220 analyzes the image and the various information that is relevant to the image, the projection module 220 can also detect off-ramps, diverting roadways at intersections and other aspects of the roadway as depicted in the image that cause the projection module 220 to project additional centerlines. These unnecessary or extra centerlines can cause difficulties in subsequent aspects of determining the relative location of the nearby vehicle. This is because the extra centerlines generally diverge from the current centerline and thus are not useful for the purposes of locating the nearby vehicle as is the current centerline. Accordingly, the projection module 220 filters or otherwise removes the additional centerlines from the image to avoid difficulties with the additional/unnecessary centerlines interfering with the projection module 220 determining the relative location of the nearby vehicle.

The following section of pseudo code represents one approach to how the projection module 220 can identify and filter the additional centerlines. As provided for in the pseudo code, a grade (e.g., positive or negative slope) of the present roadway/lane segment is analyzed to identify a peak (e.g., local height maximum). Once the projection module 220 identifies the peak, the additional centerlines are filtered.

```
peak_found = false
    for all lane segments:
        if (peak_found):
            filter out additional centerlines under horizontal line;
        else if (lane segment is going down):
            peak_found = true;
```

At 440, the projection module 220 extends an edge of the bounding box to intersect the current centerline at an intersection point. In one embodiment, the projection module 220 extends a bottom edge of the bounding box horizontally to intersect with the current centerline. In general, the projection module 220 extends the edge in order to, for example, locate the centerline in relation to the bounding box. By extending the edge of the bounding box, the projection module 220 identifies a segment of the current centerline which is likely proximate to a closest point between the bounding box and the current centerline. Accordingly, the projection module 220 extends the bottom edge of the bounding box by extrapolating coordinates of a line segment that form the bottom edge horizontally within the image. The projection module 220 can then detect the intersection point according to, for example, a visual analysis of the image, by determining when the values of the centerline and the extended line are equal, or by another suitable approach.

At 450, the projection module 220 calculates distances between the bounding box and points along the current centerline that are around the intersection point. In one embodiment, the projection module 220 is searching for a closest point between the current centerline and the bounding box at 440, 450, and 460. Thus, at 450, the projection module 220 calculates distances between the bounding box (e.g., a lower corner point of the bounding box or point on the bounding box that is proximate to the current centerline) and various points on the current centerline that are around the intersection point. For example, the projection module 220 can calculate the distances by progressing along the current centerline in both directions away from the intersection point until, in one embodiment, distances for a defined number of points have been calculated, the distances steadily exhibit an increasing trend, and so on. In this way, the projection module 220 searches among points on the current centerline that are proximate to the intersection point and that likely include the closest point.

At 460, the projection module 220 determines a closest point of the current centerline to the bounding box. In one embodiment, the projection module 220 sorts the distances calculated at 450 associated with the various points on the current centerline. Once the projection module 220 sorts the distances, the projection module 220 identifies the closest point as the minimum distance of the distances from 450. However, in one embodiment, the projection module 220 also performs a check on the closest point prior to identifying the closest point. That is, the projection module 220 checks whether the closest point is, for example, an end point of the search. In other words, if the minimum distance is found to be associated with a point that is a furthermost point from the intersection point at an end of where the projection module 220 selected points for which to calculate distances, then the projection module 220, in one embodiment, proceeds to verify the closest point.

In one embodiment, the projection module 220 verifies the closest point by calculating distances for points around the closest point and verifying that the distance of the closest point is less than the surrounding points. In this way, the projection module 220 can ensure the validity of the closest point and avoid falsely identifying the closest point as an end point of a search.

At 470, the projection module 220 determines a relative location of the nearby vehicle/object in relation to the scanning vehicle 100 using the image. In one embodiment, the projection module 220 uses the distance of the closest point from the current centerline, as previously determined, to calculate the relative location of the nearby vehicle/object. The relative location is a position of the nearby vehicle/object that is relative to the scanning vehicle 100. Accordingly, in one embodiment, the relative position is an (x, y, z) location in, for example, meters that is relative to a zero position of the scanning vehicle 100. In this way, the projection module 220 can use determined elements from the image such as the current centerline, and the distance of the closest point to the bounding box to calculate a position of the nearby vehicle/object.

At 480, the projection module 220 projects the nearby vehicle/object onto the map 250. In one embodiment, the projection module 220 uses the relative location determined at 470 from the image to determine an actual location of the nearby vehicle/object and to provide the projection therefrom. For example, the projection module 220 uses the operating characteristics of the scanning vehicle 100 to determine the actual location (i.e., longitude, latitude, elevation). In one embodiment, the projection module 220 uses the GPS location and, for example, at least the yaw of the scanning vehicle 100 to estimate the actual location of the nearby vehicle/object using the determined relative location from the image.

Once the projection module 220 determines/estimates the actual location, the projection module 220 can update the map 250 by projecting the nearby vehicle onto the map 250. In one embodiment, the projection module 220 locates the nearby vehicle/object within the map 250 as a function of the actual location. Moreover, the projection module 220 can also, in one embodiment, identify a type of the object (e.g., vehicle, pedestrian, bicycle, motorcycle, etc.) and project the nearby object with an appropriate size and, for example, orientation. In this way, the projection module 220 provides the map 250 with an accurate representation of the nearby object in both location and size/orientation. Furthermore, while a single iteration of projecting the nearby object into the map 250 is discussed, it should be appreciated that the projection module 220 is configured, in one embodiment, to project the object for each image that is obtained in which the nearby object is present. That is, the projection module 220, in one embodiment, updates the map 250 for a series of images obtained as part of a video. As an additional aspect, in one embodiment, the projection module 220 can maintain previously acquired images and information about the nearby object within the database 240. Accordingly, the projection module 220 can utilize the stored information to provide additional information about the nearby object over time such as, for example, speed, direction, etc.

As an additional example, consider FIG. 5, which illustrates an example image 500. The image 500 is illustrated as a contrasting line drawing for purposes of this disclosure in order to provide a clear image for discussion. However, it should be appreciated that the image 500 is generally a camera image that is provided in a color format. In either case, the image 500 is shown with a vehicle 510 within a bounding box 520. Additionally, the image 500 also illustrates a current centerline 530 along with extra centerlines 540. Accordingly, consider the methods 300 and 400 in relation to the image 500 of FIG. 5.

In general, the projection module 220 initiates the process of localizing the vehicle 510 upon receiving the image 500 and recognizing that the image 500 includes the vehicle 510. Thus, the projection module 220 outlines the vehicle 510 with the bounding box 520 in order to distinguish the vehicle 510 from other aspects of the image 500 and to identify the vehicle 510. Moreover, the projection module 220 can then proceed to determine the relative location of the vehicle 510.

For example, the projection module 220 extends the current centerline 530 of a current lane of travel for the scanning vehicle 100. As previously mentioned in relation to block 430, the projection module 220 also generates the extra centerlines 540 as an artifact of projecting the centerline 530. In other words, as a manner of analyzing the image 500 to project the centerline 530, the projection module 220 also generates the centerlines 540. Therefore, the projection module 220 can further analyze the line 530 and the lines 540 in order to identify that the centerlines 540 are distinct from the current centerline 530 and then removes/filters the centerlines 540 from the image 500.

Moreover, the image 500 can then be represented in a simplified form as shown in FIG. 6. Diagram 600 is provided for purposes of illustration and is not intended to represent an image that is otherwise acquired by the object projection system 170. In either case, the image 600 illustrates the bounding box 520 and the current centerline 530 of FIG. 5. Furthermore, the diagram 600 also illustrates a bottom edge 610 of the bounding box that has been extended horizontally to intersect the current centerline 530 at an intersection point 620. Accordingly, upon extending the bottom edge 610, the projection module 220 identifies the intersection point 620 and proceeds to search for a closest point of the current centerline 530 to the bounding box 520.

Thus, the projection module 220 analyzes points in both directions along the current centerline 530 to locate the closest point by calculating a distance of the points to the bounding box 520. In one embodiment, the projection module 220 calculates the distances using a center point of the bounding box 520 or, for example, a lower corner of the bounding box 520. In either case, the projection module 220 determines a plurality of distances that are each associated with a different point on the current centerline 530.

Subsequently, the projection module 220 sorts the calculated distances and determines which of the distances is a minimum distance. The minimum distance correlates with the closest point to the bounding box 520 and as shown in FIG. 6 is also, in this example, the intersection point 620. In further embodiments, the projection module 220 may further verify the closest point as discussed previously. In either case, the projection module 220 proceeds by using the distance of the closest point to the bounding box 520 to determine a relative location of the vehicle 510 in relation to the vehicle 100 from which the image 500 was initially acquired. As previously indicated, the projection module 220 can provide the relative location as an x, y, z coordinate in relation to the vehicle 100.

From the relative location, the projection module 220 generates, for example, an estimate of a longitude and latitude for the vehicle 510 and projects the vehicle 510 into the map 250. Alternatively, in one embodiment, the projection module 220 simply uses the relative position to project the vehicle 510 into the map 250. In general, the projection module 220 knows a position of the vehicle 100 as determined from, for example, the navigation system 147. Thus, once the relative position of the vehicle 510 is determined the projection module 220 can extrapolate the actual position of the vehicle 510 or project the vehicle 510 relative to the vehicle 100. In either case, the projection module 220 modifies the map 250 to include a representation of the vehicle 510 at the determined location.

Moreover, as previously mentioned, the projection module 220 can also provide a particular representation of an object that is being projected. For example, the projection module 220 can assess a width and height of the bounding box 520 to estimate a size of the vehicle 510, can use image recognition techniques to identify a type and/or model of the object, and so on. Thus, the projection module 220 can provide a depiction of a particular object in the map 250 according to actual characteristics of the object.

In either case, the control module 230, in one embodiment, can then use the map 250 with projected objects as included by the projection module 220 to perform various tasks. The various tasks can include autonomously controlling the vehicle 100, providing information to a service (e.g., traffic service), generating alerts to a passenger/driver, and/or other tasks that are informed according to an awareness of the objects that are projected into the map 250.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. In one embodiment, the data stores 115 and memory 210 are distributed memories that are accessed over a communication channel. Accordingly, the data stores 115 and the memory 210 may be cloud-based storage accessed over a network connection. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more obstacle maps 118. The obstacle map(s) 118 can include information about one or more obstacles located within one or more geographic areas. The obstacles can be objects that extend above ground level. The one or more obstacles included in the static obstacle map(s) 118 can have location data, size data, dimension data, material data, and/or other associated data. The obstacle map(s) 118 can include measurements, dimensions, distances, and/or information for one or more static obstacles. The obstacle map(s)

118 can be high quality and/or highly detailed. The obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., the present context).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system (GPS), a local positioning system or a geolocation system.

The processor(s) 110, the object projection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the object projection system 170, and/or the autonomous driving module(s) 160 may control some or all of these vehicle systems 140 and, thus, may be partially or fully autonomous.

The processor(s) 110, the object projection system 170, and/or the autonomous driving module(s) 160 can be operatively connected to communicate with the various vehicle systems 140 and/or individual components thereof. For example, returning to FIG. 1, the processor(s) 110, the object projection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the object projection system 170, and/or the autonomous driving module(s) 160 may control some or all of these vehicle systems 140.

The processor(s) 110, the object projection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the object projection system 170, and/or the autonomous driving module(s) 160 can control the direction and/or speed of the vehicle 100. The processor(s) 110, the object projection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the object projection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, a distributed memory, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An object projection system associated with a scanning vehicle, comprising:
   one or more processors;
   a memory including instructions and that is communicably coupled to the one or more processors, the memory storing:
      a projection module for determining a relative location of a nearby vehicle in relation to the scanning vehicle from an image without using sensor data from additional sensors about an external environment when the sensor data about the nearby vehicle from the additional sensors is unavailable and responsive to identifying the nearby vehicle in the image of the external environment surrounding the scanning vehicle, the image being generated by a camera,
      wherein the projection module determines the relative location of the nearby vehicle by (i) projecting a current centerline of a lane of the scanning vehicle along a roadway in the image, and (ii) determining a closest point of the current centerline to a bounding box that outlines the nearby vehicle, and
      wherein the projection module projects the nearby vehicle into a map according to at least the relative location determined from the image; and
   a control module for controlling the scanning vehicle according to the map.

2. The object projection system of claim 1, wherein the projection module identifies the nearby vehicle by analyzing the image to distinguish the nearby vehicle from the external environment and outlining the nearby vehicle using the bounding box.

3. The object projection system of claim 1, wherein the projection module further determines the relative location by generating the relative location according to a calculated distance of the nearby vehicle from the closest point to the current centerline, and wherein the relative location is a position that is relative to the scanning vehicle.

4. The object projection system of claim 1, wherein the projection module further determines the closest point by (i) extending an edge of the bounding box to intersect the current centerline at an intersection point and (ii) searching for the closest point to the bounding box among proximate points around the intersection point by calculating distances of the proximate points to the bounding box.

5. The object projection system of claim 1, wherein the projection module further determines operating characteristics of the scanning vehicle by retrieving associated data from one or more sensors of the scanning vehicle, wherein the one or more sensors include a global position system (GPS) sensor, a tachometer, and an inertial monitoring unit (IMU) sensor, and wherein the operating characteristics include at least a current location of the scanning vehicle.

6. The object projection system of claim 1, wherein the projection module further projects the nearby vehicle into the map by localizing the nearby vehicle using the relative location and one or more operating characteristics of the scanning vehicle, wherein the projection module further projects the current centerline by filtering secondary centerlines of additional travel lanes from the image that interfere with determining the closest point.

7. The object projection system of claim 1, wherein the projection module further acquires the image of the external environment, wherein the image is from the camera and includes a field-of-view along a roadway around the scanning vehicle, and wherein the map is an obstacle map that identifies locations of obstacles in the external environment.

8. A non-transitory computer-readable medium storing instructions that when executed by one or more processors cause the one or more processors to:
responsive to identifying a nearby vehicle in an image of an external environment surrounding a scanning vehicle, the image being generated by a camera, determining a relative location of the nearby vehicle in relation to the scanning vehicle from the image without using sensor data from additional sensors about an external environment when the sensor data about the nearby vehicle from the additional sensors is unavailable,
wherein the instructions to determine the relative location of the nearby vehicle include instructions to (i) project a current centerline of a lane of the scanning vehicle along a roadway in the image, and (ii) determine a closest point of the current centerline to a bounding box that outlines the nearby vehicle;
project the nearby vehicle into a map according to at least the relative location determined from the image; and
control the scanning vehicle according to the map.

9. The non-transitory computer-readable medium of claim 8, wherein the instructions to determine the relative location include instructions to generate the relative location according to a calculated distance of the nearby vehicle from the closest point to the current centerline, and
wherein the instructions to determine the closest point include instructions to (i) extend an edge of the bounding box to intersect the current centerline at an intersection point and (ii) search for the closest point to the bounding box among proximate points around the intersection point by calculating distances of the proximate points to the bounding box.

10. The non-transitory computer-readable medium of claim 8, wherein the instructions to determine operating characteristics of the scanning vehicle include instructions to retrieve associated data from one or more sensors of the scanning vehicle, wherein the one or more sensors include a global position system (GPS) sensor, a tachometer, and an inertial monitoring unit (IMU) sensor, and wherein the operating characteristics include at least a current location of the scanning vehicle.

11. The non-transitory computer-readable medium of claim 8, wherein the instructions to project the nearby vehicle into the map include instructions to localize the nearby vehicle using the relative location and one or more operating characteristics of the scanning vehicle, and wherein the instructions to project the current centerline include instructions to filter secondary centerlines of additional travel lanes from the image that interfere with determining the closest point.

12. A method of localizing objects around a scanning vehicle using an image generated by a camera, comprising:
responsive to identifying a nearby vehicle in the image of an external environment surrounding the scanning vehicle, determining a relative location of the nearby vehicle in relation to the vehicle from the image without using sensor data from additional sensors about the external environment when the sensor data about the nearby vehicle from the additional sensors is unavailable,
wherein determining the relative location of the nearby vehicle includes (i) projecting a current centerline of a lane of the scanning vehicle along a roadway in the image, and (ii) determining a closest point of the current centerline to a bounding box that outlines the nearby vehicle;
projecting the nearby vehicle into a map according to at least the relative location determined from the image; and
controlling the scanning vehicle according to the map.

13. The method of claim 12, wherein identifying the nearby vehicle includes analyzing the image to distinguish the nearby vehicle from the external environment and outlining the nearby vehicle using the bounding box.

14. The method of claim 12, wherein determining the relative location includes generating the relative location according to a calculated distance of the nearby vehicle from the closest point to the current centerline,
wherein projecting the nearby vehicle into the map includes localizing the nearby vehicle using the relative location and one or more operating characteristics of the scanning vehicle, wherein the one or more operating characteristics include at least a current location of the scanning vehicle, and wherein the relative location is a position that is relative to the scanning vehicle.

15. The method of claim 12, further comprising:
determining operating characteristics of the scanning vehicle by retrieving associated data from one or more sensors of the scanning vehicle, wherein the one or more sensors include a global position system (GPS) sensor, a tachometer, and an inertial monitoring unit (IMU) sensor, and
wherein projecting the current centerline includes filtering secondary centerlines of additional travel lanes from the image that interfere with determining the closest point.

16. The method of claim 12, wherein determining the closest point includes (i) extending an edge of the bounding box to intersect the current centerline at an intersection point and (ii) searching for the closest point to the current centerline among proximate points around the intersection point by calculating distances of the proximate points to the bounding box.

17. The method of claim 12, further comprising:
acquiring, by the scanning vehicle, the image of the external environment, wherein the image is from the camera and includes a field-of-view along a roadway around the scanning vehicle.

* * * * *